US006407152B1

(12) United States Patent
Butler et al.

(10) Patent No.: US 6,407,152 B1
(45) Date of Patent: Jun. 18, 2002

(54) METHOD FOR PREPARING ASPHALT AND POLYMER COMPOSITIONS INCORPORATING MULTI-COMPONENT CROSSLINKING AGENTS

(75) Inventors: James R. Butler, Houston; Kevin P. Kelly, Friendswood, both of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/723,951

(22) Filed: Nov. 28, 2000

(51) Int. Cl.[7] .............................................. C08L 95/00
(52) U.S. Cl. ............................ 524/59; 524/68; 524/69; 524/70; 524/71
(58) Field of Search .............................. 524/59, 68, 69, 524/70, 71

(56) References Cited

U.S. PATENT DOCUMENTS

| | | | |
|---|---|---|---|
| 3,803,066 A | 4/1974 | Petrossi ........................ | 524/71 |
| 4,130,516 A | 12/1978 | Gagle et al. .................... | 524/71 |
| 4,145,322 A | 3/1979 | Maldonado et al. ........... | 524/68 |
| 4,170,702 A | 10/1979 | Hirsch .......................... | 528/219 |
| 4,242,246 A | 12/1980 | Maldonado et al. ........... | 524/71 |
| 5,017,230 A | 5/1991 | Hopkins et al. ............. | 106/229 |
| 5,371,121 A | 12/1994 | Bellomy et al. ............... | 524/68 |
| 5,382,612 A | 1/1995 | Chaverot et al. .............. | 524/68 |
| 5,605,946 A | 2/1997 | Planche et al. ................ | 524/68 |
| 5,756,565 A | 5/1998 | Germanaud et al. .......... | 524/68 |
| 5,795,929 A | 8/1998 | Grubba ......................... | 524/68 |
| 6,180,697 B1 | 1/2001 | Kelly et al. | |
| 6,218,449 B1 * | 4/2001 | Planche et al. ................ | 524/68 |

* cited by examiner

*Primary Examiner*—Peter Szekely
(74) *Attorney, Agent, or Firm*—William D. Jackson

(57) ABSTRACT

A process for the preparation of an asphalt and polymer composition in which a minor amount of polymer component is subjected to a crosslinking. An asphalt base material is heated in a mixing chamber at a temperature sufficient to melt the asphalt and allow stirring of the asphalt within the chamber. A thermoplastic elastomer is added to the chamber in an amount not greater than 12 wt. %. While the asphalt elastomer formulation is stirred, a crosslinking agent is added in an amount effective to crosslink the thermoplastic elastomer. The crosslinking agent formulation comprises at least two components. One component is a thiopolymer incorporating organic sulfur prepared by the reaction of 6-tertiary butyl cresol and sulfur dichloride which reacts to produce a reaction product comprising 4,4-thiobis(6-tertiary butyl-m-cresol) and the thiopolymer, followed by subsequent separation of the 4,4-thiobis(6-tertiary-butyl-m-cresol) from the thiopolymer product. The second crosslinking component comprises a source of sulfur to crosslink the thermoplastic elastomer. The second crosslinking component may be selected from the group consisting of elemental sulfur, polythiomorpholine, specifically dithiodimorpholine, zinc-2-mercaptothiazole and mixtures thereof

24 Claims, No Drawings

METHOD FOR PREPARING ASPHALT AND POLYMER COMPOSITIONS INCORPORATING MULTI-COMPONENT CROSSLINKING AGENTS

FIELD OF THE INVENTION

This invention relates to the preparation of asphalt polymer compositions through the use of a multi-component crosslinking system incorporating a thiopolymer and at least one other crosslinking component.

eters relating to properties such as viscosity, toughness, tenacity and ductility. Each of these parameters define an important feature of the bitumen composition and compositions failing to meet one or more of these parameters may well render that composition unacceptable for use as road pavement material. Table 1 sets forth the properties of various grades of asphalt cement (AC) as determined in accordance with AASHTO M-226 (Specification for Viscosity-Graded Asphalt Cement).

TABLE 1

Properties of Various Asphalt Grades

| TEST | AASHTO M-226 | | | | | |
|---|---|---|---|---|---|---|
| | AC 2.5 | AC 5 | AC 10 | AC 20 | AC 30 | AC 40 |
| Viscosity @140° F., poise (AASHTO T-202) | 250 + 50 | 500 + 100 | 1000 + 200 | 2000 + 400 | 3000 + 600 | 4000 + 800 |
| Viscosity @275° F.; cSt, minimum (AASHTO T-201) | 125 | 175 | 250 | 300 | 350 | 400 |
| Pen. @77° F.; minimum AASHTO t-49) | 220 | 140 | 80 | 60 | 50 | 40 |
| Flash Point, COC Minimum ° F. | 325 | 350 | 425 | 450 | 450 | 450 |
| Ductility After TFOT (AASHTO T-179) @77° F., 5 cm/min, minimum | 100 | 100 | 75 | 50 | 40 | 25 |
| Viscosity After TFOT (AASHTO T-179) @140° F., poise minimum | 1000 | 2000 | 4000 | 8000 | 12000 | 16000 |
| | AR1000 | AR2000 | AR4000 | AR8000 | AR16000 | |
| Viscosity @140° F., poise (AASHTO T-202) | 1000 + 250 | 2000 + 500 | 4000 + 1000 | 8000 + 2000 | 16000 + 4000 | |
| Viscosity @275° F., cSt minimum (AASHTO T-201) | 140 | 200 | 275 | 400 | 500 | |
| Pen. @77° F., minimum (AASHTO T49) | 65 | 40 | 25 | 20 | 20 | |
| Percent of Original Pen. @77° F., minimum | B | 40 | 45 | 50 | 52 | |
| Ductility @77° F., minimum, 5 cm/min | 100 | 100 | 75 | 75 | 75 | |

BACKGROUND OF THE INVENTION

The use of bitumen (asphalt) compositions in preparing aggregate compositions (bitumen +rock) useful as road paving material is complicated by at least three factors, each of which imposes a serious impediment to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Performance standards and properties relating to asphalt cements are set forth in various standards of the American Society for Testing and Materials (ASTM) and the American Associate of State Highway and Transportation Officials (AASHTO). Current Federal Highway Administration specifications designate a bitumen (asphalt) product, for example, AC-20R ("R" meaning rubber modified), as meeting defined param- Conventional bitumen compositions frequently cannot meet all of the requirements of a particular specification simultaneously and, if these specifications are not met, damage to the resulting road can occur, including permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good Theological properties.

It is also known that the stability of polymer-bitumen compositions can be increased by the addition of crosslinking agents such as sulfur, frequently in the form of elemental sulfur. It is believed that the sulfur chemically couples the polymer and the bitumen through sulfide and/or polysulfide bonds. The addition of extraneous sulfur is required to produce the improved stability, even though natural bitumens naturally contain varying amounts of native sulfur.

Thus, U.S. Pat. No. 4,145,322, issued Mar. 20, 1979 to Maldonado et al., discloses a process for preparing a bitumen-polymer composition consisting of mixing a bitumen, at 266°–446° F. (130°–230° C.), with 2 to 20% by weight of a block copolymer, having an average molecular weight between 30,000 and 300,000, with the theoretical formula $S_x$—$B_y$, in which S corresponds to styrene structure groups and B corresponds to conjugated diene structure groups, and x and y are integers. The resulting mixture is stirred for at least two hours, and then 0.1 to 3% by weight of sulfur relative to the bitumen is added and the mixture agitated for at least 20 minutes. The preferred quantity of added sulfur cited in this patent is 0.1 to 1.5% by weight with respect to the bitumen. The resulting bitumen-polymer composition is used for road coating, industrial coating, or other industrial applications.

U.S. Pat. No. 4,130,516, issued Dec. 19, 1978 to Gagle et al., discloses an asphalt (bitumen) polymer composition obtained by hot-blending asphalt with 3 to 7% by weight of elemental sulfur and 0.5 to 1.5% by weight of a natural or synthetic rubber, preferably a linear, random butadiene/styrene copolymer. U.S. Pat. No. 3,803,066, issued Apr. 9, 1974 to Petrossi, also discloses a process for preparing a rubber-modified bitumen by blending rubber, either natural or synthetic, such as styrene/butadiene rubber, with bitumen at 293°–365°F. (145°–185° C.), in an amount up to 10% by weight based on the bitumen, then adjusting the temperature to 257°–320° F. (125°–160°C.), and intimately blending into the mix an amount of sulfur such that the weight ratio of sulfur to rubber is between 0.3 and 0.9. A catalytic quantity of a free-radical vulcanization-accelerator is then added to effect vulcanization. This patent recites the critical nature of the sulfur to rubber ratio, and teaches that weight ratios of sulfur to rubber of less than 0.3 gives modified bitumen of inferior quality.

Although polymer-modified bitumen compositions are known, these previously described compositions are not necessarily useful for road paving applications. For example, mixing NorthWest paving asphalt having an initial viscosity of 682 poise at 140° F. (60° C.) with 3.6 weight percent Kraton®-4141, a commercially available styrene-butadiene tri-block copolymer which contains 29 weight percent plasticizer oil, and 0.25% sulfur gives a modified-asphalt composition with a viscosity of 15,000 poise at 140° F. (60° C.). This viscosity, however, greatly exceeds the acceptable viscosity range set by the widely used AC-20R specification for paving asphalt. This specification, issued by the Federal Highway Administration, requires bitumen compositions to have a viscosity in the range of 1600–2400 poise at 140° F. (60° C.). Thus, the modified bitumen compositions produced by the procedures of U.S. Pat. No. 4,145,322 using Kraton®-4141 would be unacceptable for use in road paving under the AC-20R specification.

A second factor complicating the use of bitumen compositions involves the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

A third factor complicating the use of bitumen compositions involves the use of volatile solvents in such compositions. Specifically, while such solvents have been heretofore proposed as a means to fluidize bitumen-polymer compositions containing relatively small amounts of sulfur which compositions are designed as coatings (Maldonado et al., U.S. Pat. No. 4,242,246), environmental concerns restrict the use of volatile solvents in such compositions. Moreover, the use of large amounts of volatile solvents in bitumen compositions may lower the viscosity of the resulting composition so that it no longer meets viscosity specifications designated for road paving applications. In addition to the volatile components, reduction of other emissions during asphalt applications becomes a target. For example, it is desirable to reduce the amount of sulfur compounds that are emitted during asphalt applications.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

Previously, various polymers have been added to asphalts to improve physical and mechanical performance properties. Polymer-modified asphalts are routinely used in the road construction/maintenance and roofing industries. Conventional asphalts often do not retain sufficient elasticity in use and, also, exhibit a plasticity range that is too narrow for use in many modem applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics.

The bituminous binders, even of the bitumen/polymer type, which are employed at the present time in road applications often do not have the optimum characteristics at sufficiently low polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes cross-linking of the polymer molecules until the desired asphalt properties are met. This reactant typically is sulfur in a form suitable for reacting. Such current processes are discussed in various patents such as U.S. Pat. Nos. 4,145,322 (Maldonado); 5,371,121 (Bellamy); and 5,382,612 (Chauerat), all of which are hereby incorporated by reference.

However, the cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

One result of the high viscosities experienced at increased polymer concentrations is that it makes emulsification of the asphalt difficult. As is known in the art and used herein, emulsification of asphalt refers to forming an emulsion of asphalt and water. Asphalt emulsions are desirable in many applications because the emulsion may be applied at lower temperatures than hot-mix asphalts since the water acts as a carrier for the asphalt particles.

For example, hot-mix asphalts, mixes of asphalt, aggregate, and a single polymer, commonly are applied at a temperature within the range of 350° F. to 450° F. (177° C. to 232° C.) to achieve the requisite plasticity for application. In comparison, an asphalt emulsion typically may be applied at temperatures within the range of 130° F. to 170° F. (54° C. to 77° C.) to achieve the same working characteristics. Emulsified asphalt products are generally used to reduce the release of environmentally-harmful volatile organic compounds often associated with asphalts diluted with light carrier solvents such as diesel fuel, naphtha, and the like. Emulsification basically requires that the asphalt and any desired performance-enhancing additives be combined with an emulsifying agent in an emulsification mill along with about 20 to 40 percent by weight of water. However, high polymer loading in asphalt produces high viscosities and melting points, making emulsification of the polymer-asphalt composition difficult.

The bitumen/polymer compositions are prepared in practice at polymer contents which range from about 3% to 6% by weight of bitumen depending on the nature and the molecular weight of the polymer and the quality of the bitumen. Gelling of the bitumen/polymer composition, which is observed fairly frequently during the preparation of the composition or while it is stored, occurs as soon as the polymer content of this composition exceeds the above-mentioned threshold. It is thus difficult, in practice, to produce non-gellable bitumen/polymer compositions with a high polymer content, which are more economical to prepare and to transport than bitumen/polymer compositions with a lower polymer content.

U.S. Pat. No. 6,180,697, "Method for Preparation of Stable Bitumen Polymer Composition," Kevin Kelly and James R. Butler, discloses methods for the preparation of asphalt and thermoplastic elastomer compositions. The procedure in U.S. Pat. No. 6,180,697 involves the addition of a thermoplastic elastomer in concert with crosslinking formulations which include elemental sulfur, zinc-2-mercaptobenzothiazole, zinc oxide, and dithiodimorpholine as a replacement for an equivalent amount of elemental sulfur. Asphalt compositions made by this method comply with the standards for asphalt cement Grade AC-20.

SUMMARY OF THE INVENTION

In accordance with the present invention there is provided a process for the preparation of an asphalt and polymer composition in which a minor amount of polymer component is subjected to a crosslinking. In carrying out the invention, an asphalt base material is heated in a mixing chamber at a temperature sufficient to melt the asphalt and allow stirring of the asphalt within the chamber. A thermoplastic elastomer is added to the chamber in an amount not greater than 12 wt. % based upon the composite of the elastomer and the asphalt. While the asphalt elastomer formulation is stirred, a crosslinking agent is added in an amount effective to crosslink the thermoplastic elastomer. The crosslinking agent formulation comprises at least two components. One component is a thiopolymer incorporating organic sulfur prepared by the reaction of 6-tertiary butyl cresol and sulfur dichloride which reacts to produce a reaction product comprising 4,4-thiobis(6-tertiary butyl m cresol) and the thiopolymer, followed by subsequent separation of the 4,4-thiobis(6-tertiary-butyl-m-cresol) from the thiopolymer product. The second crosslinking component comprises a source of sulfur to crosslink the thermoplastic elastomer.

In a preferred embodiment of the invention, the second crosslinking component is selected from the group consisting of elemental sulfur, polythiomorpholine, preferably dithiodimorpholine, zinc-2-mercaptothiazole and mixtures thereof. In yet a further aspect of the invention, the secondary crosslinking agent comprises elemental sulfur. In a further aspect of the invention the secondary crosslinking agent is selected from the group consisting of dithiodimorpholine, zinc-2-mercaptobenzothiazole, or a mixture of zinc-2-mercaptothiozole and dithiodimorpholine. In yet a further aspect of the invention, the secondary crosslinking agent comprises a mixture of elemental sulfur and at least one zinc compound selected from the group consisting of zinc oxide and zinc-2-mercaptobenzothiazole.

DETAILED DESCRIPTION OF THE INVENTION

The present invention may be carried out in the preparation of bitumen-polymer compositions of any suitable type under reaction conditions which are well-known to those skilled in the art. The present invention incorporates a multi-component crosslinking system which can include a thiopolymer byproduct from the manufacture of 4,4-thiobis (6-tertiary butyl-m-cresol) in combination with an additional crosslinking agent which provides a further source of sulfur to crosslink the thermoplastic elastomer. As disclosed for example is U.S. Pat. No. 4,170,702 to Hirsch, 4,4-thiobis (6-tertiary butyl-m-cresol) is a well-known antioxidant which can be used for the protection of various polymers including rubber compounds from oxidation. The thiopolymer is recovered as the bottoms product from the manufacture of 4,4-thiobis(6-tertiary butyl-m-cresol) by the reaction of the 6-tertiary butyl-m-cresol and sulfur dichloride. After recovery of the 4,4-thiobis(6-tertiary butyl-m-cresol), a heavy polymeric byproduct which contains organic sulfur can be recovered. This thiopolymer is available from Flexsys Chemicals under the designation "Permanex." As indicated by the experimental work described below, this thiopolymer byproduct forms an effective crosslinking system when used in conjunction with a second component which also functions as a sulfur donor.

The secondary component of the crosslinking system may include any suitable sulfur-containing compound of the type normally used for crosslinking purposes in asphalt-polymer formulations. As indicated by the experimental work discussed below, a polythiomorpholine such as dithiomorpholine (DTDM) is an effective crosslinking agent in non-hydrogen sulfide emitting crosslinking systems. However, DTDM is a relatively expensive material, and in carrying out the present invention, the thiopolymer byproduct employed here can be used as a replacement for at least half of the DTDM employed in such systems. Stated otherwise, where the crosslinking system incorporates a polythiomorpholine such as DTDM, the thiopolymer byproduct can be used in an amount at least equal to the amount of the DTDM—that is, the ratio of thiopolymer to DTDM is 1 or greater. As indicated by the experimental work, ratios of thiopolymer to DTDM of 2 form effective crosslinking systems. In addition to DTDM systems, the second crosslinking component can take the form of a mixture of DTDM and a zinc compound such as zinc 2-mercaptobenzothiazole (ZMBT) or zinc oxide with the ZMBT, either alone or in combination with zinc oxide, usually being preferred.

In the asphalt industry, various terms are used and are understood to have fairly well defined meanings. The following is a description of the terminology used and the standards applied in describing the present invention.

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Preferred bitumens have an initial viscosity at 140° F. (60° C.) of 600 to 3000 poise depending on the grade of asphalt desired. The initial penetration range (ASTM D5) of the base bitumen at 77° F. (25° C.) is 50 to 320 dmm, preferably 75 to 150 dmm, when the intended use of the copolymer-bitumen composition is road paving. Bitumens that do not contain any copolymer, sulfur, etc., are sometimes referred to herein as "base bitumen".

The term "volatile solvent" refers to a hydrocarbon solvent which has a distillation point or range which is equal to or less than 350° C. Such solvents are known to vaporize to some extent under ambient conditions and, accordingly, pose environmental concerns relating to hydrocarbon emissions.

The term "substantially free of volatile solvent" is used to denote that the complete (final) bitumen composition contains less than about 3.5 weight percent of volatile solvent. Preferably, the bitumen composition contains less than about 2 weight percent of volatile solvent and more preferably, less than about 1 weight percent of volatile solvent.

"Elastomeric Polymers" are natural or synthetic rubbers and include butyl, polybutadiene, polyisoprene or polyisobutene rubber, ethylene/vinyl acetate copolymer, polyacrylate, polymethacrylate, polychloroprene, polynorbomene, ethylene/propylene/diene (EPDM) terpolymer and advantageously a random or block copolymer of styrene and a conjugated dienes. It is preferred to use styrene/conjugated diene block copolymers, linear, radial, or multi-branched. Styrene/butadiene and styrene/isoprene copolymers having an average molecular weight of between 30,000 and 300,000 have been found to be particularly useful in the present invention.

"Conjugated-diene" refers to an alkene compound having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units which copolymers are represented by the formula: $S_x$—$D_y$—$S_z$ where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known per se in the art. Preferably, such tri-block copolymers are derived from styrene and a conjugated-diene, wherein the conjugated-diene is butadiene or isoprene. Such copolymers preferably contain 15 to 50 percent by weight copolymer units derived from styrene, preferably 25 to 35 percent derived from styrene, more preferably 28 to 31 percent derived from styrene, the remainder being derived from the conjugated diene. These copolymers preferably have a number average molecular weight range between 50,000 and 200,000, more preferably between 100,000 and 180,000. The copolymer can employ a minimal amount of hydrocarbon solvent in order to facilitate handling. Examples of suitable solvents include plasticizer solvent, which is a non-volatile aromatic oil. However, when the hydrocarbon solvent is a volatile solvent (as defined above), care should be taken to ensure that the amount of solvent contained in the final bitumen composition is less than about 3.5 weight percent.

Unless the context indicates otherwise, the term "sulfur" refers to elemental sulfur in any of its physical forms or any sulfur donating compound. Sulfur donating compounds are well known in the art and include various organic compositions or compounds that generate sulfur under the mixing or preparation conditions of the present invention. Preferably, the elemental sulfur is in powder form known as flowers of sulfur.

The term "desired Rheological Properties" refers to bitumen compositions having a viscosity at 140° F. (60° C.) of from 1600 to 4000 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging. Each of these desired Rheological Properties are necessary parameters in meeting the AC-20(R) specifications for bitumen compositions suitable for use as road pavement material (See Table 1).

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅛-inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325°+/−5° F. (163°+/−2.8° C.) for seven days. Preferably the viscosity does not increase by a factor of two or more during storage at 325° F. (163° C.) for seven days. More preferably the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially unblown or unoxidized solid or semi-solid materials at room temperature that gradually liquify when heated. Its predominant constituents are bitumens, which may be naturally occurring or obtained as the residue of refining processing. The asphalt cements are generally characterized by a penetration (PEN, measured in tenths of a millimeter, dmm) of less than 400 at 25° C., and a typical penetration is between 40 and 300 (ASTM Standard, Method D-5). The viscosity of asphalt cement at 60° C. is more than about 65 poise. Asphalt cements are often defined in terms specified by the American Association of State Highway Transportation Officials (AASHTO) AR viscosity system, also known as SHRP (Strategic Highway Research Program). Two sets of typical specifications are shown in Table 1 set forth previously.

The asphalt terms used herein are well known to those skilled in the art. For an explanation of these terms, reference is made to the booklet SUPERPAVE Series No. 1 (SP-1) "Performance Graded Asphalt Binder Specification and Testing," 1998, published by the Asphalt Institute (Research Park Drive, P.O. Box 14052, Lexington, Ky. 40512-4052), which is hereby incorporated by reference in its entirety. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBR) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62–65 of the booklet include Table 1 entitled "Performance Graded Asphalt Binder Specifications." The asphalt compositions are given performance grades, for example, PG 64-22. The first number, 64, represents the average 7-day maximum pavement design temperature in ° C. The second number, −22, represents the minimum pavement design temperature in ° C. Other requirements of each grade are shown in the table. For example, the maximum value for the PAV-DSR test (° C.) for PG 64-22 is 25° C.

Industry custom uses the short form RTFO DSR to indicate the temperature at which a sample will show sufficient rutting resistance after rolling thin film oven (RTFO) aging (minimum rutting resistance as defined as a "G*/sin δ" over 2.20 kPA and measured by a dynamic shear rheometer (DSR)). Similarly, m-value is the short form to indicate the minimum temperature in degrees Centigrade at which a sample will exceed an m-value of 0.300 after 60 seconds of loading on the bending beam rheometer. The S value is the corresponding value in ° C. corresponding to the allowable deflection at 60 seconds. The operation of the bending beam rheometer to determine S values and M values is described in the SUPERPAVE Series I publication at pages 29–35. The S and M values reported in the experimental work presented herein are the specification values in ° C. as contrasted with the measured values which are 10° C. above the specification values. For the various systems described below, the M value consistently provides a higher temperature than the S value, and thus the M value is the limiting factor indicating the lowest ambient temperature at which the asphalt can be used for road fen paving.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as cigar tubes or toothpaste tubes. These tubes are about one inch in diameter and about fifty centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut in one thirds, three equal sections. The softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, most states require a difference of 4° F. (2° C.) or less to consider the asphalt/rubber composition as compatible. Few standards allow a higher difference. The twenty-four hour test is used as a common comparison point.

In accordance with one embodiment of the present invention, an asphalt composition is prepared by adding the asphalt or bitumen to a mixing chamber. The mixing chamber may be of any suitable type such as a 90 to 4000 barrel tank equipped with a rotary stirring system for mild agitation of the contents. The asphalt is added and stirred at elevated temperatures. Stirring temperatures depend on the viscosity of the asphalt and can range up to 500° F. Asphalt products from refinery operations are well known in the art. For example, asphalts typically used for this process are obtained from deep vacuum distillation of crude oil to obtain a bottom product of the desired viscosity or from a solvent deasphalting process that yields a demetalized oil, a resin fraction and an asphaltene fraction. Some refinery units do not have a resin fraction. These materials or other compatible oils of greater than 450° F. flash point may be blended to obtain the desired viscosity asphalt.

Rubbers or thermoplastic elastomers suitable for this application are well known in the art as described above. For example, Finaprene products available from Fina Oil and Chemical Company, are suitable for the applications of the present invention. This example is not limiting for the technology, which can be applied to any similar elastomeric product produced from styrene and butadiene.

Crosslinking agents for asphalt applications are also well known in the art. As examples, U.S. Pat. No. 5,017,230 to Hopkins et al., U.S. Pat. No. 5,756,565 to Germanaud et al., U.S. Pat. No. 5,795,929 to Grubba, and U.S. Pat. No. 5,605,946 to Planche et al disclose various crosslinking compositions and refer to other patents that disclose crosslinking compositions. For various reasons including costs, environmental impact, and ease of use, elemental sulfur with ran organic zinc compounds are preferred. Most crosslinking formulations use elemental sulfur due to cost. In special situations, the sulfur can be added with a sulfur donor such as dithiodimorpholine, zinc thiuram disulfide, or any compound with two or more sulfur atoms bonded together. The zinc is added as zinc 2-mercaptobenzothiazole, zinc tetraalkylthiuram disulfide, zinc oxide, zinc dialkyl-2-benzosulfenamide, or other suitable zinc compound or mixtures thereof. The present invention is particularly useful in the addition of normally solid or non-liquid crosslinking agents. These crosslinking agents are normally sold in powder or flake form.

The invention provides for the preparation of asphalt and polymer compositions which can be made to have properties that comply with Federal standards for grade AC-20. In one embodiment the invention includes the method for preparing asphalt and polymer compositions by heating the asphalt in a stirred tank to a temperature sufficient to allow stirring of the asphalt in the tank, wherein said temperature is at least 330° F. but preferably not more than 380° F. A thermoplastic elastomer is added, preferably a styrene-butadiene polymer, to the tank in an amount not greater than twelve percent and preferably not greater than ten percent by weight of the total composition to form a mixture. A multi-component crosslinking system formulated in accordance with the invention composition is added to the composition and stirring is continued for at least forty-five minutes while maintaining the temperature.

Another application of the invention involves the preparation of an asphalt composition having properties that comply with or exceed Federal standards for grade AC-20 in which the secondary crosslink component comprises zinc 2-mercaptobenzothiazole and dithiodimorpholine. The asphalt in a stirred tank is heated to a temperature sufficient to allow stirring of the asphalt in the tank, wherein said temperature is at least 330° F. A thermoplastic elastomer is added, to the tank in an amount not greater than twelve percent to form a mixture. A crosslinking composition incorporating the thiopolymer and the above-described secondary to component is added to the composition, and stirring is continued for at least forty-five minutes while maintaining the temperature.

As indicated previously, a preferred application of the present invention involves the use of the above-described thiopolymer byproduct in combination with a secondary crosslinking component involving DTDM, ZMBT, and mixtures of DTDM and ZMBT as well as elemental sulfur and zinc oxide. A particular application of the present invention is in the use of the thiopolymer as an improvement to various multi-component crosslinking agent systems. These various crosslinking agents are described below in relative amounts, without the addition of the thiopolymer employed in the present invention, that is, before the improvement involving the addition of the thiopolymer as an additive component or as a substituted component is made.

One basic crosslinking composition is comprised of at least 0.02 percent by weight based on the asphalt of zinc 2-mercaptobenzothiazole (ZMBT) and at least 0.1 percent by weight based on the asphalt of dithiodimorpholine, preferably in the weight ratio of zinc 2-mercaptobenzothiazole to dithiodimorphohne of about 0.2–0.3.

Another formulation is used in conjunction with 2-mercaptobenzothiazole, zinc oxide and mixed polythiodimorpholine as the crosslinking agents. The formulation includes the method of heating the asphalt in a stirred tank to a temperature sufficient to allow stirring of the asphalt in the tank, wherein said temperature is at least 330° F. but preferably not more than 380° F. A thermoplastic elastomer is added, preferably a styrene-butadiene polymer, to the tank in an amount not greater than twelve percent and preferably not greater than ten percent by weight of the total composition to form a mixture. The crosslinking composition is added to the composition and stirring is continued for at least forty-five minutes while maintaining the temperature.

This crosslinking composition is comprised of at least 0.02 percent and preferably 0.06 percent by weight based on the asphalt of 2-mercaptobenzothiazole, at least 0.1 and preferably at least 0.2 percent by weight based on the asphalt of mixed polythiomorpholine, at least 0.03 percent and preferably 0.06 percent by weight based on the asphalt of zinc oxide and preferably in the ratio of 2-mercaptobenzothiazole to zinc oxide to mixed polythiomorpholine of 0.3/0.3/1.0. Further, the amount of 2-mercaptobenzothiazole added is preferably from 2 percent to 5 percent by weight of thermoplastic elastomer.

Mixed polythiomorpholine is a mixture of polythiomorpholine molecules. Each polythiomorpholine has from two to eight sulfur atoms in a central chain and a morpholine molecule attached to each end of the sulfur chain. For example, trithiodimorpholine has a central chain of three sulfur atoms with a terminating morpholine molecule attached to sulfur atoms one and three. The most commonly used polythiomorpholine is dithiodimorpholine (DTDM) which has two 4,4-sulfur atoms.

The aforementioned U.S. Pat. No. 6,180,697 discloses testing and discovery of preferred crosslinking agents comprised of organic zinc compounds, elemental sulfur and/or sulfur donors. The entire disclosure of U.S. Pat. No. 6,180,697 is incorporated herein by reference. In particular, sulfur is used in combination with zinc 2-mercaptobenzothiazole (ZMBT) and zinc oxide. However, it was noted that gel formation was problematic. Gels occurred when sulfur concentration exceeded 0.3% (relative to asphalt) when 4.0% Finaprene® FP401 elastomer is used During preparation of these bitumen/polymer compositions hydrogen sulfide emissions can occur when elemental sulfur is used as one of the crosslinking agents. To eliminate or reduce hydrogen sulfide emissions, sulfur-donating compounds are used in place of the elemental sulfur. Sulfur donating compounds include, among other compounds, mercaptobenzothiazole IT), dithiodimorpholine (DTDM), mixed polythiomorpholine (MPTM), and ZMBT.

Experimental work involving a variety of such crosslinking agents with and without elemental sulfur and with various polymers is reported in the tables below. Three different polymers were employed in this experimental work, namely Finaprene® FP502, FP401, and FP411. These polymers were selected for use in the tests due to their beneficial effects in aiding bitumen compositions in passing SHRP (SUPERPAVE Highway Research Program testing and grading specifications are maintained by AASHTO). Finaprene® FP502 and FP411 are styrene-butadiene block copolymers having a butadiene/styrene ratio of 69/31 and are available from Atofina Petrochemicals, Inc., Houston, Texas. Similarly, Finaprene® FP401 is a styrene-butadiene block copolymer having a butadiene/styrene ratio of 78/22 and is available from Atofina Petrochemicals, Inc., Houston, Tex.

The procedure for testing the bitumen/elastomer compositions involved addition of the polymer to a mixing tank containing molten base bitumen at 350° F. with stirring at 2500 RPM for 45 minutes. Stirring was reduced to low shear of 250 RPM and crosslinking agents were then added. Stirring was continued for 3 hours. The material was allowed to stand without stirring for 24 hours at 350° F. Samples were taken for compatibility testing and SHRP grading. The particular polymer and crosslinking agents of each test are identified in the respective tables.

TABLE 2

| | MBT/ZnO/S Crosslinker | | | | | |
|---|---|---|---|---|---|---|
| Sample number | 964-80 | 964-81A | 982-02 | 964-81B | 964-82A | 964-82B |
| Base Bitumen - wt % | 100 | 96 | 96 | 96 | 96 | 96 |
| Polymer - wt % | | 4% FP502 | 4% FP502 | 4% FP502 | 4% FP401 | 4% FP401 |
| Crosslinker - ZMBT wt % | — | — | 0.05 | — | — | — |
| Crosslinker - DTDM wt % | — | — | 0.2 | — | — | — |
| Crosslinker - MBT wt % | — | — | — | 0.08 | — | 0.08 |
| Crosslinker - ZnO wt % | — | — | — | 0.04 | — | 0.04 |
| Crosslinker- S wt % | — | — | — | 0.08 | — | 0.08 |
| Compatibility Test: | | | | | | |
| Top number Degrees Fahrenheit | — | 191.7 | 188.6 | 175.3 | 182.2 | 172.1 |

TABLE 2-continued

MBT/ZnO/S Crosslinker

| Sample number | 964-80 | 964-81A | 982-02 | 964-81B | 964-82A | 964-82B |
|---|---|---|---|---|---|---|
| Compatibility Delta Temp. Degrees F. | — | 39.6 | 22.1 | 0.2 | 31.8 | 8.5 |
| SHRP Testing: | | | | | | |
| Binder DSR | 66.2 | | | 85.8 | | 83 |
| RTFO DSR | 70.5 | | | 90.5 | | 87.8 |
| PAV DSR | 23.6 | | | 21.9 | | 22.3 |
| M-value | −11.76 | | | −13.54 | | −13.54 |
| S-value | −22.99 | | | −21.77 | | −23.3 |
| SHRP Grade | PG64-16 | | | PG82-22 | | PG82-22 |

Table 2 indicates that relatively incompatible polymers can be used in a bitumen/polymer composition using a combination of MBT, ZnO and elemental sulfur as the crosslinking agents. In contrast, sample 982-02 using ZMBT and DTDM with the styrene-butadiene polymer FP502 did not produce an acceptable formulation (compatibility delta temperature of 22.1 degrees). However, using MBT, ZnO and sulfur in a ratio of 0.08/0.04/0.08 allowed a compatible composition with superior SHRP grade improvement. The SHRP higher temperature grade improved from 64 to 82 degrees Centigrade, while the SHRP lower temperature grade improved from −16 to −22 degrees Centigrade.

The other polymer tested in Table 2 also demonstrated improved results using MBT/ZnO/S crosslinking agents. An equivalent improved SHRP grade was obtained with Finaprene® FP411. Adjustments may be made depending upon a customer's compatibility specification. Hence it will be recognized that the basic crosslinking systems are applicable to various styrene-butadiene polymers.

Table 3 identifies test samples that resulted in gel formation. Samples made using the extremely incompatible Finaprene® FP411 polymer (incompatibility of 94° F. delta temp.) with the MBT/ZnO/S crosslinking system did not result in acceptable compositions. At high polymer concentrations problems were found with all three polymers tested. For example, with a 10 percent weight of polymer, two of the polymers formed gels with the MBT/ZnO/S crosslinking system, while the third polymer developed a crust after 24 hours of aging.

Another test of the MBT/ZnO/S crosslinking system was undertaken to determine the effect dilution has on polymer compatibility. Polymer Finaprene® FP502 was selected for this test due to its high incompatibility (39.6 degrees delta Temperature without crosslinking agents). Bitumen/polymer compositions with identical compositions of bitumen, polymer, and crosslinking agents were prepared using different methods and their results compared in Table 4. The first procedure used to prepare the 4% polymer/bitumen composition followed the previously described procedure. Polymer is added to a mixing tank containing molten base bitumen at 350° F. with stirring at 2500 RPM for 45 minutes. Siring was reduced to low shear of 250 RPM and crosslinking agents were then added.

The alternate method of preparing the 4% polymer/bitumen composition involved first preparing a 10% polymer/bitumen/crosslink agent composition and then mixing this composition with additional bitumen at a ratio of 60% bitumen to 40% of 10% polymer composition to provide a composition with 4% polymer.

Table 4 demonstrates that the first procedure is superior to the alternate procedure of diluting a 10% polymer composition. Under the first procedure, compatibility was extremely satisfactory (0.2 degree delta temperature) while the alternate procedure did not make the composition compatible (22.1 degree delta temperature).

TABLE 3

MBT/ZnO/S Crosslinker

| Sample number | 964-83A | 964-83B | 964-85 | 964-86 | 964-87 |
|---|---|---|---|---|---|
| Base Bitumen - wt % | 96 | 96 | 90 | 90 | 90 |
| Polymer - wt % | 4% FP411 | 4% FP411 | 10% FP502 | 10% FP401 | 10% FP411 |
| Crosslinker - ZMBT wt % | — | — | — | — | — |
| Crosslinker - DTDM wt % | — | — | — | — | — |
| Crosslinker - MBT wt % | — | 0.08 | 0.2 | 0.2 | 0.2 |
| Crosslinker - ZnO wt % | — | 0.04 | 0.1 | 0.1 | 0.1 |
| Crosslinker - S wt % | — | 0.080 | 0.2 | 0.2 | 0.2 |
| Compatibility Test: | | Gelled | 24-hr crust | Gelled | Gelled |
| Top number Degrees Fahrenheit | 235.7 | — | — | — | — |
| Compatibility Delta Temp. Degrees F. | 94 | — | — | — | — |

TABLE 4

Effect of Dilution

| Sample number | Direct addition | | Dilution from Concentrate | Concentrate |
|---|---|---|---|---|
| | 964-81A | 964-81B | 964-88 | 964-85 |
| Base Bitumen-wt % | 96 | 96 | 96 | 90 |
| Polymer-wt % | 4% FP502 | 4% FP502 | 4% FP502 | 10% FP502 |
| Crosslinker-ZMBT wt % | — | — | — | — |
| Crosslinker-DTDM wt % | — | — | — | — |
| Crosslinker-MBT wt % | — | 0.08 | 0.08 | 0.2 |
| Crosslinker-ZnO wt % | — | 0.04 | 0.04 | 0.1 |
| Crosslinker-S wt % | — | 0.08 | 0.08 | 0.2 |
| Compatibility Test: | | | | |
| Top number Degrees Fahrenheit | 191.7 | 175.3 | 189.1 | |
| Compatibility Delta Temp. Degrees F. | 39.6 | 0.2 | 22.1 | |

An alternate to the use of sulfur in the crosslinking system was tested, with results indicated in Tables 5 and 6. Specifically, mixed polythiomorpholine (MPTM) is used in place of sulfur. Table 5 shows the effect that increasing the amount of MPTM has upon the composition. This work indicates that a minimum amount of 0.2% MPTM is required in order to achieve a compatible composition with 4% FP502 elastomer.

TABLE 5

Increasing Amounts of MPTM

| Sample number | 964-80 | 982-02 | 982-03 | 982-08 | 982-09 | 982-07 |
|---|---|---|---|---|---|---|
| Base Bitumen - wt % | 100 | 96 | 96 | 96 | 96 | 96 |
| Polymer - wt % | | 4% FP502 | 4% FP502 | 4% FP502 | 4% FP502 | 4% FP502 |
| Crosslinker - ZMBT wt % | — | 0.05 | — | — | — | — |
| Crosslinker - DTDM wt % | — | 0.2 | — | — | — | — |
| Crosslinker - MBT wt % | — | — | 0.06 | 0.04 | 0.06 | 0.06 |
| Crosslinker - MPTM wt % | — | — | 0.05 | 0.13 | 0.2 | 0.2 |
| Crosslinker - ZnO wt % | — | — | 0.06 | 0.033 | 0.1 | 0.06 |
| Compatibility Test: | | | | | | |
| Top number Degrees Fahrenheit | — | 188.6 | 201.8 | 178.1 | 179.1 | 170.9 |
| Compatibility Delta Temp. Degrees F. | — | 22.1 | 28 | 14.8 | 10.4 | 1.2 |

Table 6 shows the results of using 0.2% MPTM and varying MBT and ZnO amounts in a 4% polymer/bitumen composition. The 4% polymer/bitumen composition was not compatible until sufficient MBT and ZnO are included as crosslinking agents, and preferably 0.06% of each.

TABLE 6

MPTM w/ZnO and MBT

| Sample number | 964-80 | 982-04 | 982-06 | 982-05 | 982-07 |
|---|---|---|---|---|---|
| Base Bitumen-wt % | 100 | 96 | 96 | 96 | 96 |
| Polymer-wt % | — | 4% FP502 | 4% FP502 | 4% FP502 | 4% FP502 |
| Crosslinker-DTDM % | — | — | — | — | — |
| Crosslinker-MBT wt % | — | 0.02 | 0.06 | 0.02 | 0.06 |
| Crosslinker-MPTM % | — | 0.2 | 0.2 | 0.2 | 0.2 |
| Crosslinker-ZnO % | — | 0.005 | 0.005 | 0.06 | 0.06 |
| Compatibility Test: | | | | | |
| Top number Degrees Fahrenheit | — | 184.7 | 174.9 | 172.6 | 170.9 |
| Compatibility Delta Temp. Degrees F. | — | 26.1 | 5.2 | 11.4 | 1.2 |
| SHRP Testing: | | | | | |
| Binder DSR | 66.2 | | 87.98 | 87 | 86.8 |
| RTFO DSR | 70.5 | | 89.1 | 88.3 | 85.1 |
| PAV DSR | 23.6 | | 11.8 | 18.2 | 17.7 |
| M-value | −11.76 | | −13.82 | −11.35 | −14.94 |
| S-value | −22.99 | | −21.27 | −28.24 | −21.09 |
| SHRP Grade | PG64-16 | | PG82-22 | PG82-16 | PG82-22 |

A comparison of the two crosslinking systems disclosed, indicates that both enhance SHRP properties in a polymer/bitumen composition. The MBT/ZnO/S system of Table 2 compares in performance with the MBT/ZnO/MPTM system of Table 6. The availability of multiple viable crosslinking systems allows raw material costs to be minimized during the production of SHRP polymer/bitumen compositions.

Further experimental work respecting the use of the thiopolymer in accordance with the invention was carried out employing a rubber asphalt sample incorporating 96 wt. % asphalt and 4 wt. % of styrene butadiene rubber components under the designation Finaprene® 401 and Finaprene® 502 used in the previously described experimental work. In each case, the formulation included 96% of the asphalt and 4% of the rubber compound. The previously described thiopolymer under the designation Permanex was employed in amounts of 0.2 and 0.4 wt. % of the asphalt-rubber formulation and ZMBT was used in every test in an amount of either 0.01 or 0.02 wt. %. In addition, zinc oxide was used in two tests in the amount of 0.01%, elemental sulfur in two tests in an amount of 0.12%, and the polythiodimorpholine DTDM employed in two tests in the amount of 0.1%.

In this experimental work, the rubber component was added to the asphalt component under high shear mixing conditions at 350° F. with activation of the stirring at 2500 rpm. After 0.7 hours, the shear ratio was reduced and the various crosslinking agents employed in the experimental work were added at the same time to the asphalt rubber composition with stirring at 350° F. and 250 rpm. Upon addition of the crosslinking agents, stirring of the formulation was continued for three hours at 350° F. after which samples were obtained and stored at 350° F. for 24 hours. Samples were then obtained and compatibility tests were carried out. The results in terms of the compatibility testing as well as binder, RTFO, and PAV temperatures are reported in Table 7. As can be seen from an examination of the data presented in Table 7, extremely good compatibility values were obtained for each sample, with the exception of Samples 3 and 4 containing 0.2 wt. % Permanex and 0.02% ZMBT with no other additives. Here, as indicated in runs for Samples 3 and 4, an excessive lower compatibility number was produced in one case and a marginal number in the other. However, in all of the other tests, very good compatibility figures were indicated.

may be suggested to those skilled in the art, and it is intended to cover all such modifications as fall within the scope of the appended claims.

What is claimed is:

1. A method for preparing an asphalt and polymer composition comprising:
   a. heating an asphalt base material in a mixing chamber to a temperature sufficient to melt the asphalt and allow the stirring of the asphalt within the chamber;
   b. adding a thermoplastic elastomer to the chamber in an amount not greater than 12 wt. % based upon the elastomer and the asphalt;
   c. incorporating a crosslinking agent formulation effective to crosslink the thermoplastic elastomer and comprising:

TABLE 7

Thiopolymer with ZMBT

|  |  | 1 | 2 | 3 | 4 | 5 | 6 | 7 | 8 |  |
|---|---|---|---|---|---|---|---|---|---|---|
| Book # |  |  |  |  |  |  |  |  |  | 99–107 |
| 305 tk PAR | 99–107 | 96 | 96 | 96 | 96 | 96 | 96 | 96 | 96 | 100 |
| FP 401-F | 99–183 | 4 | — | 4 | — | 4 | — | 4 | — | — |
| FP 502 | 99–171 | — | 4 | — | 4 | — | 4 | — | 4 | — |
| Permanax | 99–182 | 0.4 | 0.4 | 0.2 | 0.2 | 0.2 | 0.2 | 0.2 | 0.2 | — |
| ZMBT | 98–139 | 0.01 | 0.01 | 0.02 | 0.02 | 0.02 | 0.02 | 0.02 | 0.02 | — |
| ZnO |  | 0.01 | 0.01 | — | — | — | — | — | — | — |
| Sulfur |  | — | — | — | — | 0.12 | 0.12 | — | — | — |
| DTDM | 98–245 | — | — | — | — | — | — | 0.1 | 0.1 | — |
| Top number ° F. |  | 144.2 | 144.2 | 150.4 | 145.9 | 146.9 | 150.7 | 146.9 | 146.4 | Control; |
| Compatibility$_A$ T ° F. |  | 0.2 | 0.4 | 6.5 | 3.2 | 0.2 | 0.5 | 1.0 | 1.0 | PAR305tk |
| Binder DSR |  | 77.9 | 78.1 | 78.2 | 77.3 | 79.0 | 79.8 | 79.1 | 78.9 | 65.9 |
| RFTO DSR |  | 75.3 | 78.4 | 76.0 | 74.9 | 75.5 | 75.8 | 75.5 | 77.0 | 66.4 |
| PAV DSR |  | 19.8 | 21.2 | 21.0 | 21.0 | 20.4 | 20 | 16 | 19.4 | 22.2 |
| M-value |  | −14.68 | −14.26 | −13.08 | −14.57 | −17.60 | −17.79 | −15.19 | −15.18 | −14.68 |
| s-value |  | −18.24 | −17.78 | −17.04 | −17.86 | −20.59 | −19.70 | −19.05 | −18.28 | −13.89 |
| Grade |  | PG70-22 | PG76-22 | PG76-22 | PG70-22 | PG70-22 | PG70-22 | PG70-22 | PG76-22 | PG64-22 |

Table 7 also shows performance grade specifications for the formulations 1–8. Dynamic sheer rheometer (DSR) data are shown for the binder for aging characteristics simulated in a rolling thin film oven (RTFO) and a pressure aging vessel (PAV). Pavement design temperatures are indicated in degrees C. M values and S values are also given in ° C., and the corresponding grade in accordance with the performance grade asphalt binder specifications are designated in the last entry in Table 7. As can be seen from an examination of the data presented in Table 7, the use of the Permanex thiopolymer is highly effective in the absence of the DTDM in every case except where only small amounts, 0.02% of ZMBT is used alone without the presence of either zinc oxide or another sulfur-donating component.

When ZMBT is employed in the secondary cross4inking component, as is preferred, it is preferred to provide a weight ratio of the thiopolymer to the ZMBT of at least 10. Substantially higher ratios can be employed particularly where another zinc additive such as zinc oxide or increased amounts of the thiopolymer are employed. The ratio of thiopolymer to zinc oxide, as indicated by Formulations 1 and 2, can be as high as 40 with very good results, as indicated by compatibility values.

Where the thiopolymer ZMBT ratio is near the lower value of 10, very good results are achieved so long as another sulfur component, such as elemental sulfur in Formulations 5 and 6 or DTDM in Formulations 7 and 8, is present. Even without these additional sulfur-containing cross-linking agents, acceptable results at a thiopolymer DTDM ratio of about 10 can be achieved as indicated by Formulation 4.

Having described specific embodiments of the present invention, it will be understood that modifications thereof (i) a primary crosslinking component provided by a thiopolymer incorporating organic sulfur prepared by the reaction of 6-t-butyl-m-cresol and sulfur dichloride to produce 4,4'-,thiobis(6-t-butyl-m-cresol) and said thiopolymer and the subsequent separation of said 4,4'-,thiobis(6-t-butyl-m-cresol) from said thiopolymer; and
(ii) a secondary crosslinking component providing a source of sulfur to crosslink said thermoplastic elastomer.

2. The method of claim 1 wherein said secondary crosslinking component is selected from the group consisting of elemental sulfur, polythiodimorpholine, zinc-2-mercaptobenzothiazole, and mixture thereof.

3. The method of claim 2 wherein said secondary crosslinking component comprises elemental sulfur.

4. The method of claim 2 wherein said secondary crosslinking agent comprises polythiodimorpholine, zinc-2-mercaptobenzothiazole, or a mixture of zinc-2-mercaptobenzothiazole and dithiodimorpholine.

5. The method of claim 2 wherein said secondary crosslinking agent comprises zinc-2-mercaptobenzothiazole.

6. The method of claim 2 wherein said secondary crosslinking agent comprises a mixture of elemental sulfur and at least one zinc compound selected from the group consisting of zinc oxide and zinc-2-mercaptobenzothiazole.

7. The method of claim 2 wherein said polythiodimorpholine comprises dithiodimorpholine and the ratio of said thiopolymer to said dithiodimorpholine is at least 1.

8. The method of claim 7 wherein the ratio of said thiopolymer to said dithiodimorpholine is at least 2.

9. The method of claim 2 wherein said secondary crosslinking agent comprises zinc, mercaptobenzothiazole, and the weight ratio of said thiopolymer to said zinc mercaptobenzothiazole is at least 10.

10. The method of claim 2 wherein said secondary crosslinking agent comprises a mixture of zinc-2-mercaptobenzothiazole in an amount of at least 0.02 wt. % based upon the as asphalt base material and at least 0.1 wt. % of dithiodimorpholine based upon said asphalt base material.

11. The method of claim 10 wherein the weight ratio of zinc-2-mercaptobenzothiazole to dithiomorpholine in said secondary crosslinking agent is within the range of about 0.2–0.3.

12. The method of claim 1 wherein said thermoplastic elastomer is added to the mixing chamber in an amount no greater than 10 wt. % based upon the elastomer and the asphalt.

13. The method of claim 12 wherein said thermoplastic elastomer is added to the mixing chamber in an amount within the range of 2–8 wt. % based upon the elastomer and the asphalt.

14. In a method for the preparation of an asphalt and polymer composition comprising:
  a. heating an asphalt based material in a mixing chamber to a temperature within the range of 330°–380° F. in order to melt the asphalt and allow the stirring of the asphalt within the mixing chamber;
  b. adding a thermoplastic elastomer to the mixing chamber in an amount of no more than 10 wt. % based upon the elastomer and the asphalt base material;
  c. incorporating a crosslinking agent formulation effective to crosslink the thermoplastic elastomer and comprising:
    (i) a primary crosslinking component provided by a thiopolymer incorporating organic sulfur prepared by the reaction of 6-t-butyl-m-cresol and sulfur dichloride to produce 4,4'-,thiobis(6-t-butyl-m-cresol) and said thiopolymer and the subsequent separation of said 4,4'-,thiobis(6-t-butyl-m-cresol) from said thiopolymer; and
    (ii) a secondary crosslinking component providing a source of sulfur to crosslink said thermoplastic elastomer.

15. The method of claim 14 wherein said secondary crosslinking component is selected from the group consisting of elemental sulfur, polythiodimorpholine, zinc-2-mercaptobenzothiazole, zinc oxide and mixtures thereof.

16. The method of claim 15 wherein said secondary crosslinking component comprises zinc-2-mercaptobenzothiazole.

17. The method of claim 16 wherein said secondary crosslinking component further comprises an additional agent selected from the class of polythiodimorpholine, zinc oxide, elemental sulfur and mixtures thereof.

18. The method of claim 17 wherein said secondary crosslinking component comprises elemental sulfur.

19. The method of claim 17 wherein said secondary crosslinking component comprises zinc oxide.

20. The method of claim 17 wherein said secondary crosslinking component comprises a polythiodimorpholine.

21. The method of claim 20 wherein said polythiodimorpholine comprises dithiodimorpholine and the ratio of said thiopolymer to said dithiodimorpholine is at least 1.

22. The method of claim 21 wherein the ratio of said thiopolymer to said dithiodimorpholine is at least 2.

23. The method of claim 14 wherein said thermoplastic elastomer is added to the mixing chamber in an amount no greater than 8 wt. % based upon the elastomer and the asphalt.

24. The method of claim 23 wherein said thermoplastic elastomer is added to the mixing chamber in an amount within the range of 2–6 wt. % based upon the elastomer and the asphalt.

* * * * *